United States Patent [19]
Infante

[11] Patent Number: 5,273,316
[45] Date of Patent: Dec. 28, 1993

[54] FINISH PROTECTIVE COVER FOR A STATIONARY VEHICLE

[76] Inventor: Richard Infante, 1000 Monroe Turnpike, Monroe, Conn. 06468

[21] Appl. No.: 512,975

[22] Filed: Apr. 23, 1990

[51] Int. Cl.⁵ .............................................. B60J 11/00
[52] U.S. Cl. .................................. 280/770; 296/136; 150/166
[58] Field of Search ...................... 280/153.5, 770, 848, 280/849, 850; 150/166; 293/128, 112; 296/136; 24/442, 443, 450

[56] References Cited

U.S. PATENT DOCUMENTS

| | | | |
|---|---|---|---|
| 1,679,886 | 8/1928 | Wright | 296/136 |
| 2,119,072 | 5/1938 | Cohen | 280/770 |
| 2,311,514 | 2/1943 | Bramblett | 150/166 |
| 2,787,311 | 4/1957 | Cohen et al. | 150/166 |
| 2,880,015 | 3/1959 | Harben | 280/770 |
| 4,041,999 | 8/1977 | Miller | 150/166 |
| 4,531,560 | 7/1985 | Balanky | 296/136 X |
| 4,589,459 | 5/1986 | Lantrip | 296/136 X |
| 4,734,312 | 3/1988 | Sugiyama | 296/136 X |
| 4,781,231 | 11/1988 | Garcia et al. | 280/770 X |
| 4,849,272 | 7/1989 | Haney et al. | 280/770 X |
| 4,884,824 | 12/1989 | Radke | 150/166 X |
| 4,930,832 | 6/1990 | Shelton | 150/166 X |
| 4,948,191 | 8/1990 | Cao | 296/136 X |

FOREIGN PATENT DOCUMENTS 1464782  1/1967  France ................... 280/849

Primary Examiner—Brian L. Johnson
Attorney, Agent, or Firm—St. Onge Steward

[57] ABSTRACT

A finish protective cover for a stationary vehicle which comprises a left fender cover and a right fender cover, each of which is contoured to fit the left or right fenders of the vehicle, respectively, and to extend at least partially into the engine compartment or trunk and at least partially down the outer side of the fenders. The fender covers each have a first end and a second end. The protective cover also comprises a front cover which is contoured to fit across the nose or tail of the vehicle and extend at least partially into the engine compartment or trunk, the front cover having a first and second side which are removably attachable to the first end of the fender covers, respectively, and a cowl cover which is contoured to fit across the cowl of the vehicle and extend at least partially into the engine compartment or trunk, the cowl cover having a first and second side which are removably attachable to the second end of the fender covers, respectively.

12 Claims, 4 Drawing Sheets

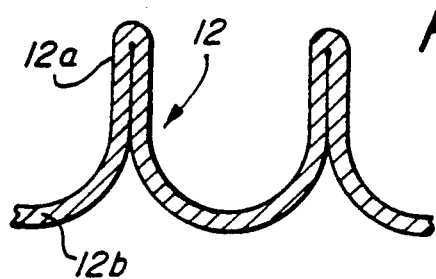
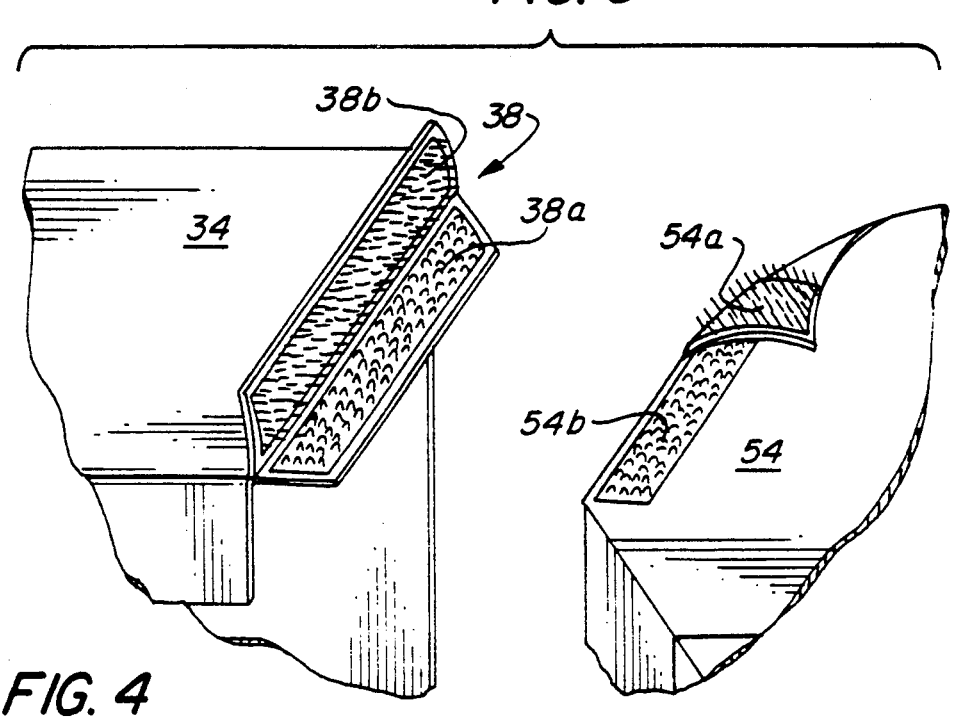
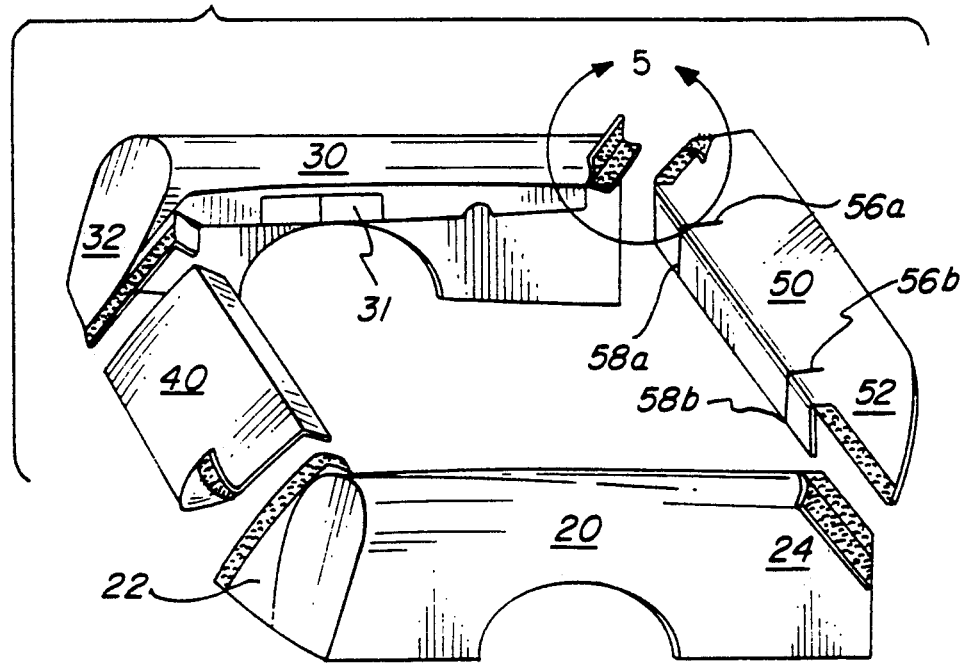

FINISH PROTECTIVE COVER FOR A STATIONARY VEHICLE

DESCRIPTION

1. Technical Field

The present invention relates to a protective cover for a stationary vehicle, which serves to protect the finish of the vehicle and is quickly and conveniently attachable thereto. The cover provides protection for the areas bordering either the engine compartment or the trunk, including the left and right fenders, the windshield or rear window, the grill or tail, and engine compartment or trunk surfaces. The cover protects the finish of the vehicle against chips, scratches, stains, and other damage which may occur while repairs or maintenance are being performed.

Recent years have seen the costs for vehicles, especially automobiles, increase dramatically. This is true not only for newer vehicles, but also for older, collectible vehicles whose appraised values are substantially higher than just a few years ago. Part of the reason for the increased cost are the more expensive finishes now applied to newer, as well as "antique" vehicles.

Of course, no matter how good the finish on a vehicle, there exists the likelihood of damage to the finish, especially when repair or maintenance work is performed on or around the vehicle. Repair work, as well as maintenance, must be done, but this poses a significant threat to a vehicle's finish. Chemicals used during repair work can often be responsible for damage to a car's finish, but, more importantly, human error, i.e., dropping or instable placement of tools, is a common reason for damage to an vehicle's finish.

What is desired, therefore, is a protective cover which can be used to protect the finish of a vehicle while repair work or maintenance is being performed.

2. Background Art

There are several examples of attempts to produce adequate protective covers for vehicles, but none have succeeded in adequately protecting the finish of a vehicle.

For instance, Cohen in U.S. Pat. No. 2,119,072, discloses the use of a large, cumbersome piece of woven fabric or leather which can be slung over and fastened to an automobile fender by a combination of fasteners, including suction or vacuum cups, button and hook fasteners, and flexible straps. The design of the Cohen fender cover does not provide for adequate coverage for the automobile since no protection is provided for the nose or grill area, the windshield, the cowl, or engine compartment or trunk surfaces.

In addition, the complex fastening means disclosed by Cohen are not only difficult to utilize, but probably inadequate for holding the cover in place and motionless during normal use. This can easily lead to displacement of the cover, causing finished areas of the fender to be worn by chaffing or exposed to damage. In addition, the fasteners themselves can damage the finish of the automobile.

Harben, in U.S. Pat. No. 2,880,015, discloses another type of fender cover which is merely a variation of the Cohen cover, and retains most of the disadvantages of Cohen. Harben discloses a rectangular piece of rubber-backed material which can be draped over the fender of a vehicle and held in place by the combination of gravity and the frictional force of the rubber backing against the surface of the fender. As was the case with Cohen, the cover of Harben does not provide adequate coverage to all areas of the vehicle, such as the windshield, the cowl, the grill, the headlight assemblies, and the nose area, which are susceptible to damage when engine repairs or maintenance are being performed. These areas are left vulnerable in the Harben design.

Moreover, Harben does not disclose a cover which is a proper fit or in conformity with the contours of the fender, and, hence, leads to the problems of chaffing or scratching of the finish caused by a loose fit. In addition, the individual performing the repairs or maintenance may be forced to drag the Harben cover between different locations in order to provide proper coverage of the work area. This can easily cause significant damage to the finish. Furthermore, the use of gravity and friction to hold the cover in place illustrates the fact that the Harben cover can easily be displaced, exposing the finish to damage.

Additional, although less apposite, covers are disclosed by Balanky in U.S. Pat. No. 4,531,560 and Lantrip in U.S. Pat. No. 4,589,459. The covers of these two patents, though, are designed for protecting the exterior finish of a vehicle from the hazards of off-road operation, for instance, driving the vehicle through areas with heavy brush or vegetation which can scratch or otherwise damage the finish. The designs of each of these patents involve affixing a protective cover to all external finished surfaces of the vehicle, and securing the covers through the use of a series of snaps, straps, magnets, and/or other fasteners.

The usefulness of these covers for protecting the finish of a vehicle during repairs or maintenance is quite unsatisfactory. For instance, both the Balanky and Lantrip covers leave unprotected areas which can often be damaged during repairs and maintenance. These areas include the windshield, engine compartment surfaces, headlights, and grill. In addition, both designs are bulky and cumbersome and, since they are designed for use during operation of the vehicle, are not easily or quickly removable.

Moreover, the cover sections of the Lantrip protective cover all work in concert to provide the proper fit. Because of this, individual panels, when used separately, are not effective since they would tend to "flop" and sag significantly, thus, providing little or no protection to the fenders when the hood of the vehicle is raised.

Unfortunately, none of the vehicle covers disclosed to date are able to adequately protect the vulnerable surfaces of a vehicle's finish during repairs or maintenance. What is needed, therefore, is a protective cover which is quickly and easily assembled on a vehicle, and yet which provides adequate protection during repairs or maintenance activity.

DISCLOSURE OF INVENTION

The present invention relates to a finish protective cover for a stationary vehicle. The protective cover comprises a left fender cover which is contoured to fit the left fender of the vehicle and to extend at least partially into the engine compartment or trunk, and also at least partially down the outer side of the left fender; and a right fender cover which is contoured to fit the right fender of the vehicle and to extend at least partially into the engine compartment or trunk, and also at least partially down the outer side of the right fender.

The inventive cover also comprises a front cover which is contoured to fit across the nose or tail of the vehicle and to extend at least partially into the engine or trunk compartment. The front cover is removably attachable at either side thereof to ends of the right and left fender covers, respectively. Moreover, the protective cover also comprises a cowl cover which is contoured to fit across the cowl of the vehicle and extend at least partially into the engine or trunk compartment. The cowl cover is also removably attachable to the ends of the left and right fender covers, respectively.

BRIEF DESCRIPTION OF THE DRAWINGS

The present invention will be better understood and it's advantages more apparent in view of the following detailed description, especially when read with reference to the appended drawings, wherein:

FIG. 4 is an exploded view of the protective cover of the present invention;

FIG. 5 is an enlarged view of the area of FIG. 4 defined by circle 5; and

FIG. 6 is a partial view in cross section of the protective cover of the invention.

DETAILED DESCRIPTION OF THE PREFERRED EMBODIMENT

The present invention relates to a finish protective cover 10 for a stationary vehicle, generally designated as 100. Although this description is written in terms of applying inventive protective cover 10 to the front engine compartment of an automobile, such is for convenience only. It will be recognized that protective cover 10 can also be applied to any of several types of vehicles, including trucks, vans, off-road vehicles, jeeps, etc. In addition, protective cover 10 can be applied about the engine compartment of rear or mid-engine vehicles, or about the trunk, whether in the front or rear, depending upon the particular compartment in which maintenance or repair work is to be performed. It will be understood by the skilled artisan that when protective cover 10 is disposed on the rear of vehicle 100, the nose section is equivalent in effect to the tail section and that the front cowl and windshield is equivalent in effect to the rear cowl and rear window.

Figure 1:
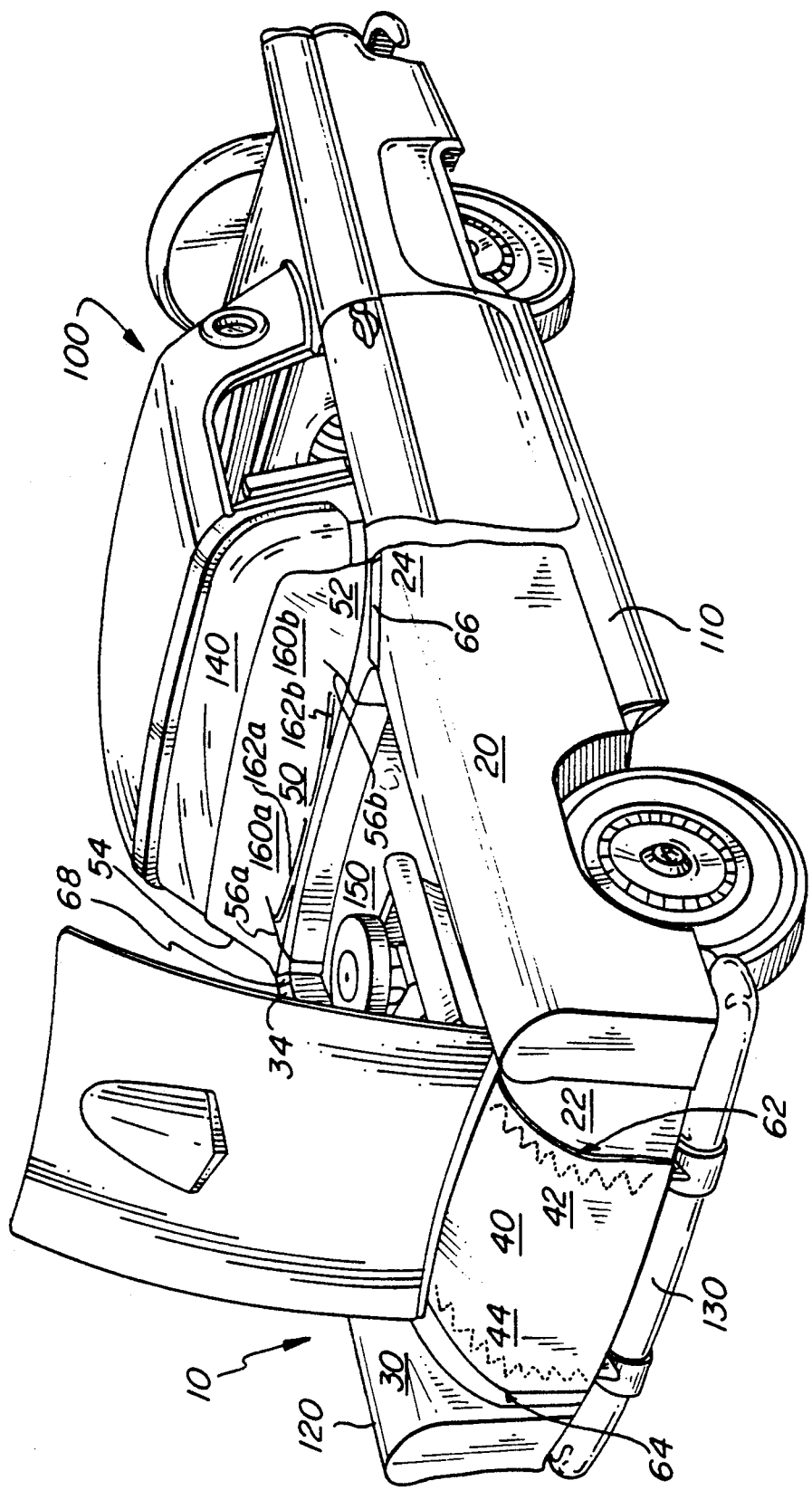
FIG. 1 is a view in perspective of the protective cover of the invention, disposed on a vehicle.
Figure 2:
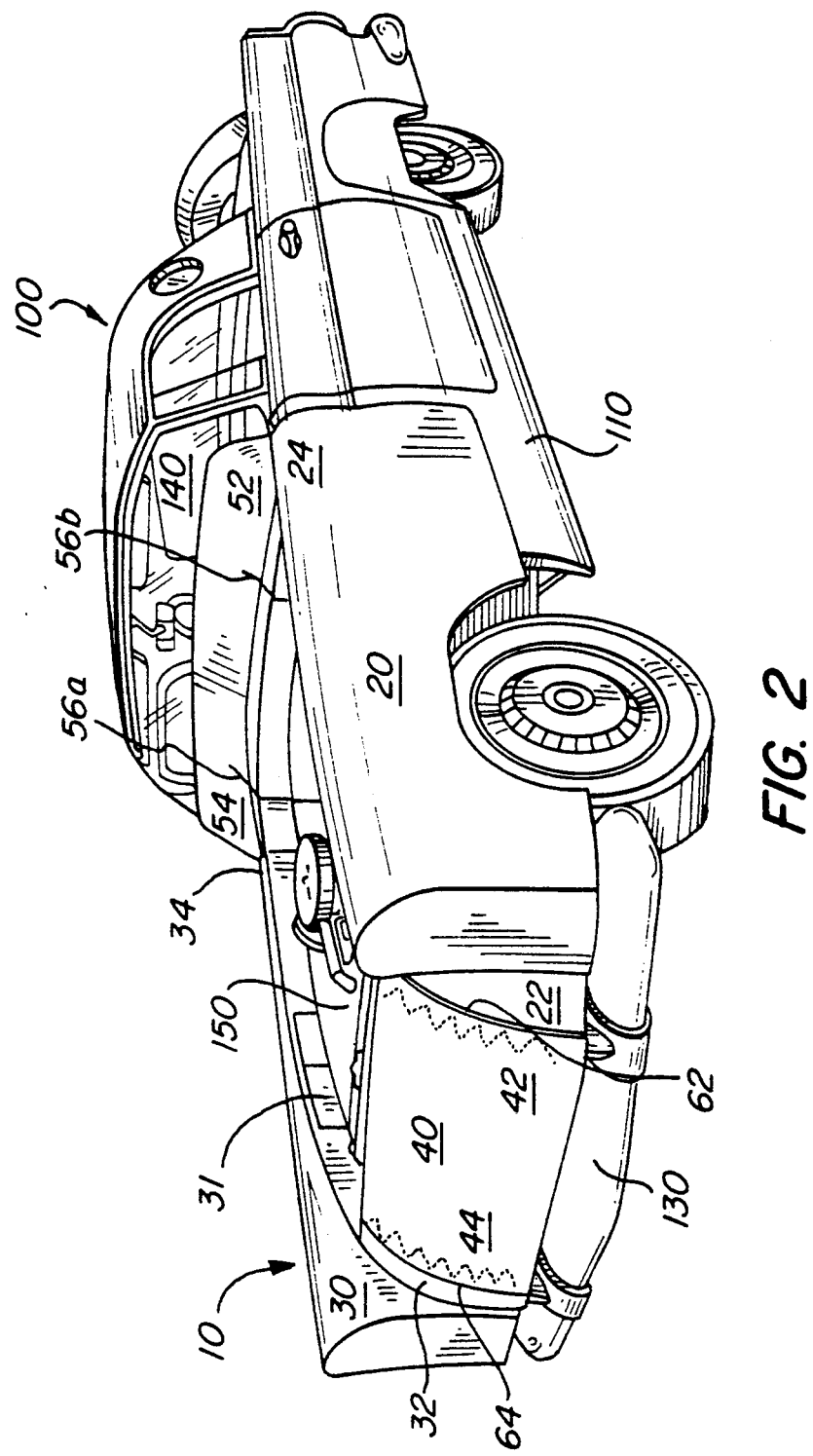
FIG. 2 is a view in perspective of the protective cover of the invention, disposed on a vehicle wherein the hood of the vehicle has been removed to allow greater access to the engine compartment.
Figure 3:
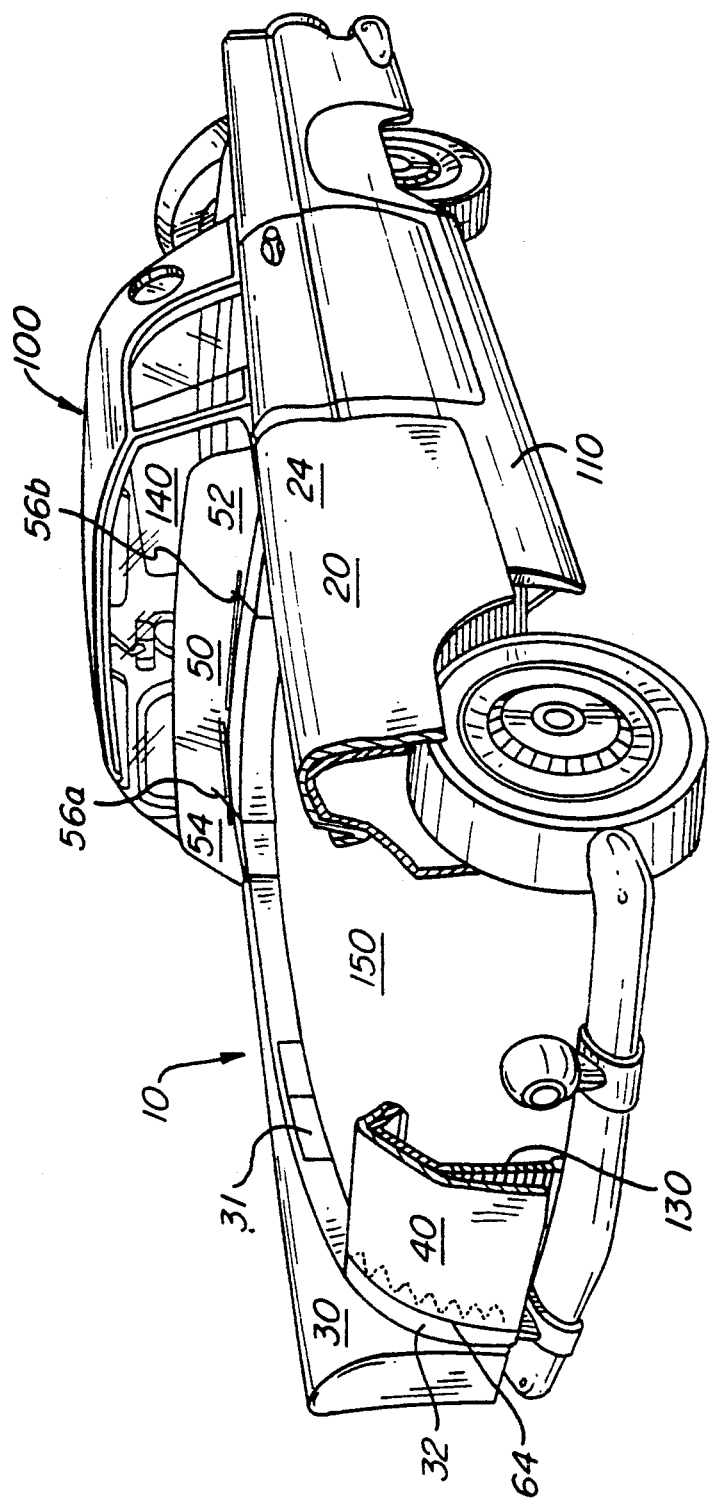
FIG. 3 is a partially broken away view in perspective of the protective cover of the invention disposed on a vehicle.

For ease of description herein, the terms "up" and "down" refer to protective cover 10 when in the orientation illustrated in FIG. 1. Moreover, the terms "front" and "rear" refer respectively to the nose portion and windshield portion of vehicle 100 respectively (when protective cover 10 is disposed about the engine compartment of a front engine vehicle). It will be recognized that for convenience all elements of protective cover 10 will not necessarily be identified in each drawing figure.

Finish protective cover 10 generally comprises four primary elements: a left fender cover 20; a right fender cover 30; a front cover 40; and a cowl cover 50. Each of these elements is preferably made from a flexible material 12 suitable for use as protective cover 10. Most preferably, as illustrated in FIG. 6, flexible material 12 is a bi-layered material which consists of an outer layer 12a of a material which is relatively resistant to abrasion or puncture as well as to tearing or to damage caused by the action of chemicals thereon; and an inner layer 12b of a material which is relatively nonabrasive.

Advantageously, outer layer 12a is a material selected from the group consisting of vinyl, leather, rubber, canvas, silk, chain mail and a malleable magnetic material (so that metallic tools can be removably attached to the cover and, thereby, kept conveniently close). Most preferably, outer layer 12a is formed of vinyl or polyvinyl due to the economy of such materials. Even when formed of a vinyl or polyvinyl material, though, outer layer 12a can contain sections or patches of a magnetic material, such as a thin layer of iron or other like metal, in amounts and locations which would not substantially interfere with the flexibility of protective cover 10 yet would provide magnetic surfaces for temporary placement of metallic tools.

As noted above, inner layer 12b of flexible material 12 is preferably a material which is relatively nonabrassive so as to avoid damage to the finish of vehicle 100 merely from use of protective cover 10. Suitable materials include foam rubber, felt, flannel cloth, lambswool, cotton weave, nylon batting, and polyester batting. Most preferred is foam rubber because of its nonabrasiveness, yet ability to adhere to a certain degree to the finish due to its coefficient of friction. Foam rubber is also preferred for economic reasons.

As illustrated in FIGS. 1 to 4, left fender cover 20 generally comprises the flexible material described above, which is contoured to fit the left fender 110 of vehicle 100. Left fender cover 20 should extend somewhat into the engine compartment 150 of vehicle 100 to protect the inner surfaces of engine compartment 150 and also extend at least partially down left fender 110 to provide protection along as much of the length of left fender 110 as possible. Moreover, left fender cover 20 should comprise a front portion or end 22 which is disposed adjacent the nose 130 of vehicle 100 (or the tail of vehicle 100 in the case of a rear engine or mid-engine vehicle) and a rear portion or end 24 which is disposed adjacent windshield 140 of vehicle 100 (or rear window of vehicle 100 in the case of a rear engine or mid-engine vehicle).

Likewise, right fender cover 30, also illustrated in FIGS. 1 to 4, is contoured to fit the right fender 120 of vehicle 100 in the same manner as left fender cover 20 fits left fender 110. Right fender cover 30 should also extend at least partially into engine compartment 150 and down right fender 120. Right fender cover 30 comprises a front portion or end 32 adjacent nose 130 and a rear portion or end 34 adjacent windshield 140 of vehicle 100.

Most advantageously, both left fender cover 20 and right fender cover 30 are contoured to the particular dimensions of vehicle 100. In other words, as is commonly known, vehicles differ in size and shape from model to model and even from year to year within the same models. Body styles have changed over the years, as have shapes. Left fender cover 20 and right fender cover 30 should be shaped such as by stitching, etc. so as to fit as closely as possible to the contouring of vehicle 100 on which they will be placed. In this way, bunching and other problems caused by poor fitting of protective cover 10, especially displacement of covers 20 and 30 can be avoided because of the close fit between left fender cover 20 and left fender 110 and right fender cover 30 and right fender 120.

In order to facilitate the contouring of left fender cover 20 and right fender cover 30 to fenders 110 and 120, the top of fender covers 20 and 30 can be corded, as shown in FIG. 6. Cording provides a better fit between fenders 110 and 120 and covers 20 and 30 and can also prevent objects from slipping into engine compartment 150. In addition, if, as illustrated in FIG. 6, double cording is provided, a channel is formed which will cause spilled liquids to harmlessly run off either left fender cover 20 or right fender cover 30 as opposed to spilling into engine compartment 150 or down left fender 110 or right fender 120.

Finish protective cover 10 further comprises a front cover 40 which extends across the nose 130 of vehicle 100 (or tail in the case of a rear engine or mid-engine vehicle) and into engine compartment 150, at least partially. Front cover 40 serves to protect the nose and grill of vehicle 100, and by extending into engine compartment 150 also protects the interior surfaces of engine compartment 150. Although in the embodiment of finish protective cover 10 illustrated in FIGS. 1 to 3, left fender cover 20 and right fender cover 30 function to protect the headlights (not shown) of vehicle 100, nose cover 40 may also be extended on either side so as to protect the headlights depending on the particular style and arrangement of vehicle 100.

Front cover 40 comprises a first side and a second side, to be referred to for convenience as left side 42 and right side 44, which are removably attachable to front end 22 of left fender cover 20 and front end 32 of right fender cover 30, respectively, as illustrated in FIGS. 1 to 4. Front cover 40 is attachable to left fender cover 20 through the agency of attachment means which can be designated as 62 and front cover 40 is attachable to right fender cover 30 through the agency of attachment means which can be designated as 64. Suitable attachment means 62 and 64 will be discussed in more detail below.

Front cover 40 is advantageously shaped to match the contours of nose 130 of vehicle 100 as closely as possible to avoid the undesirable effects of an ill-fitting cover.

Finish protective cover 10 also comprises a cowl cover 50 which serves to protect the front cowl and at least a portion of the windshield of vehicle 100 (or the rear cowl and at least a portion of the rear window in a rear engine or mid-engine vehicle). Cowl cover 50 fits across the front cowl (not shown) and, preferably, (at least partially) windshield 140 and extends at least partially into engine compartment 150. In this way, the most vulnerable areas of windshield 140 as well as the cowl and internal surfaces of engine compartment 150 are protected from damage.

Advantageously, cowl cover 50 comprises first and second sides, one of which is removably attachable to left fender cover 20 and one of which is removably attachable to right fender cover 30. For ease and convenience, the sides of cowl cover 50 will be referred to as left side 52, which is removably attachable to rear end 24 of left fender cover 20, and right side 54, which is removably attachable to rear end 34 of right fender cover 30. Cowl cover 50 is attached to left fender cover 20 through the agency of attachment means which can be designated as 66 and is attached to right fender cover 30 through the agency of attachment means which can be designated as 68.

As was the case with left fender cover 20, right fender cover 30, and front cover 40, cowl cover 50 should most preferably be sized and contoured to match as closely as possible the contours of the cowl and windshield area 140 of vehicle 100.

Attachment means 62; 64; 66; and 68 can be the same or different and are any suitable means for removably attaching the various elements of finish protective cover 10 to each other. Preferably, suitable attachment means include hook and loop type fasteners, such as those commercially available under the trademark VELCRO, zippers, hooks, snaps, buttons, tie means, tabular clasps, etc. Moreover, combinations of the various attachment means for each of attachment means 62; 64; 66; and 68, can be employed.

When attachment means formed of metallic elements are employed, it is important that steps be taken to insure that there is no contact between the metallic fastening element and the finish of vehicle 100, else the attachment means can itself cause damage to the finish. This can be avoided by, for instance, applying to the exposed metallic surfaces the material used to form the inner layer of the flexible material of finish protective cover 10.

As noted, hook and loop type fasteners such as those sold under the trademark VELCRO are preferred for use as the attachment means due to the ease of attaching and separating hook and loop type fasteners and the fact that they do not require metallic elements. Hook and loop type attachments between the elements of protective cover 10 can be disposed in a conventional manner. For instance, one component (i.e. the hook portion of the VELCRO attachment means) can be disposed on the upper side of one of the elements to be attached (i.e., the element which is to go underneath the other), whereas the other component can be disposed on the lower side of the other of the elements to be attached. In other words, if front end 22 of left fender cover 20 is to be attached to left side 42 of front cover 40, with front end 22 beneath left side 42, then one component of the VELCRO attachment means can be disposed on the upper side of front end 22 and the other component of the attachment means on the lower side of left side 42. In this way, when left side 42 is disposed on front end 22, the attachment is made.

More advantageously, a "double" attachment can be made by disposing a "Y" flap 38 at the end of one of elements 20, 30, 40, or 50, for a more secure attachment, as illustrated in FIGS. 4 and 5. By the use of flap 38, one of the components of the fastening means can be placed on the bottom flap 38a and the other on the lower surface 54a of right side 54 so that when right side 54 is laid on flap 38a, an attachment is made. Moreover, one of the components of the attachment means can also be disposed on the upper surface 54b of right side 54 and the complementary component on flap 38b. When flap 38b is then laid on right side 54, another attachment is made. In this way, the attachments between left fender cover 20 and front cover 40; between right fender cover 30 and front cover 40; between left fender cover 20 and cowl cover 50; and right fender cover 30 and cowl cover 50 are more securely made in an interlocking manner.

In assembling finish protective cover 10 on vehicle 100, the elements 20, 30, 40, and 50 can be laid on vehicle 100 in a manner illustrated in FIG. 4, and then attachments 62; 64; 66; and 68 made. In this way, vehicle protective cover 10 is securely, yet easily removably, disposed on vehicle 100 to protect the finish thereof.

Finish protecting cover 10 can also comprise other elements which are useful for the convenience of the practitioner. For instance right fender cover 30 can comprise pocket 31, and in addition left fender cover 20 can also comprise a pocket (not shown), the pockets preferably being located on the portions of left fender cover 20 or right fender cover 30 which extend into engine compartment 150. These pockets can serve for the temporary storage of small tools or parts, so that they will not be lost. In addition, left fender cover 20 and right fender cover 30 can each comprise arcuate "cut outs" as illustrated in FIGS. 1 to 4, so as to leave exposed the wheel wells of vehicle 100 to allow the practitioner access to the wheel and wheel wells during repair and maintenance operations.

Most preferably, cowl cover 50 also comprises relief holes 56a and 56b through which the windshield wiper base shafts 160a and 160b of vehicle 100 extend. By allowing windshield wiper base shafts 160a and 160b to extend through relief holes 56a and 56b, the windshield wipers 162a and 162b serve to aid in retaining cowl cover 50 on windshield 140, and also do not cause lumping or bunching of cowl cover 50 by having been disposed therebeneath. In order to more easily accomplish disposing windshield wiper base shafts 160a and 160b through cowl cover 50, cowl cover 50 most preferably comprises slits 58a and 58b which extend from an edge thereof to relief holes 56a and 56b to more easily permit passage of windshield wiper base shafts 160a and 160b through to relief holes 56a and 56b.

By use of finish protective cover 10, the finish of vehicle 100 can be protected from accidental damage due to the dropping of tools or the spilling of chemicals thereon during repair or maintenance operations. At the same time, because of the "custom" type fit of protective cover 10, it does not interfere or otherwise distract the user during the maintenance or repair operations.

The above description is for the purpose of teaching the person of ordinary skill in the art how to practice the present invention, and it is not intended to detail all of those obvious modifications and variations of it which will become apparent to the skilled worker upon reading the description. It is intended, however, that all such obvious modifications and variations be included within the scope of the present invention which is defined by the following claims.

I claim:

1. A finish protective cover for a stationary vehicle having left and right fenders, each of which has an inner side and an outer side, an engine compartment, a nose, and a cowl, the cover comprising:
   a) a left fender cover contoured to fit the left fender of the vehicle and to extend at least partially into the engine compartment and at least partially down the outer side of the left fender, the left fender cover having a first end and a second end;
   b) a right fender cover contoured to fit the right fender of the vehicle and to extend at least partially into the engine compartment and at least partially down the outer side of the right fender, the right fender cover having a first end and a second end;
   c) a front cover contoured to fit across the nose of the vehicle and extend at least partially into the engine compartment, said front cover having a first side which is removably attachable to said first end of said left fender cover and a second side which is removably attachable to said first end of said right fender cover; and
   d) a cowl cover contoured to fit across the cowl of the vehicle and extend at least partially into the engine compartment, said cowl cover having a first side which is removably attachable to said second end of said left fender cover and a second side which is removably attachable to said second end of said right fender cover.

2. The protective cover of claim 1 wherein each of said left fender cover, said right fender cover, said front cover, and said cowl cover are formed of a substantially flexible material.

3. The protective cover of claim 2 wherein said flexible material comprises a bi-layered material consisting of an outer layer of a material resistant to abrasion, puncture, and damage caused by chemicals and an inner layer of a relatively non-abrasive material.

4. The protective cover of claim 3 wherein said outer layer is selected from the group consisting of vinyl, leather, rubber, canvas, silk, chain mail, and malleable magnetic material.

5. The protective cover of claim 3 wherein said outer layer contains sections comprised of a magnetic material.

6. The protective cover of claim 3 wherein said inner layer is selected from the group consisting of foam rubber, felt, flannel cloth, lambswool, cotton weave, nylon batting, and polyester batting.

7. The protective cover of claim 1 wherein the removable attachability of said front cover and said cowl cover to said left and right fender covers is, independently, through an attachment means selected from the group consisting of hook and loop type fasteners, zippers, hooks, snaps, buttons, and tabular clasps, and combinations thereof.

8. The protective cover of claim 1 wherein said cowl cover further comprises relief holes to permit windshield wiper base shafts of the vehicle to extend therethrough.

9. The protective cover of claim 8 wherein said cowl cover further comprises slits corresponding to said relief holes, each of said slits extending from an edge of said cowl cover to said relief holes to permit passage therethrough of the windshield wiper base shafts.

10. The protective cover of claim 1 wherein said left fender cover and said right fender cover are each contoured to the shape of the corresponding wheel wells of the vehicle.

11. The protective cover of claim 1 wherein said left fender cover, said right fender cover, said front cover, and said cowl cover are each specifically contoured to the vehicle being protected.

12. The protective cover of claim 1 wherein each of said left fender cover and right fender cover comprise cording which forms a channel for runoff of spilled liquids.

* * * * *